Dec. 17, 1935.  H. FRITZ, SR  2,024,157
SLICING MACHINE
Filed Nov. 3, 1933  4 Sheets-Sheet 1

Inventor
Henry Fritz, Sr.

Dec. 17, 1935.　　　　　H. FRITZ, SR　　　　　2,024,157

SLICING MACHINE

Filed Nov. 3, 1933　　　4 Sheets-Sheet 2

Inventor
Henry Fritz Sr.
By DeWitt Jones.
Attorney

Dec. 17, 1935.  H. FRITZ, SR  2,024,157
SLICING MACHINE
Filed Nov. 3, 1933   4 Sheets-Sheet 3

Inventor
Henry Fritz Sr.
By Ira Milton Jones
Attorney

Dec. 17, 1935.  H. FRITZ, SR  2,024,157
SLICING MACHINE
Filed Nov. 3, 1933  4 Sheets-Sheet 4

Inventor
Henry Fritz Sr.
By Morsey

Patented Dec. 17, 1935

2,024,157

UNITED STATES PATENT OFFICE 2,024,157

SLICING MACHINE

Henry Fritz, Sr., Sheboygan, Wis.

Application November 3, 1933, Serial No. 696,464

9 Claims. (Cl. 146—153)

This invention relates to bread slicing machines and in its general aspects is similar to that embodied in my co-pending application, Serial No. 553,282, filed July 27th, 1931.

One of the major objects of this invention is to provide a slicing machine of inexpensive but practical and sturdy construction.

Another object of this invention is to provide a slicing machine wherein the entire reciprocable cutting units are readily removable from the machine to permit substitution of one unit for another so that the machine may be quickly adapted to different slice thicknesses.

A further object of this invention is to improve the specific construction of the cutting units to provide a unit of such construction that all strain incidental to the tension of the cutting blades is borne entirely by the cutting unit without imparting any stress upon the guides which mount the unit for reciprocation.

Another object of this invention is to provide a cutting unit for slicing machines in which the cutting edges of the blades collectively form a non-planar cutting barrier so that initial engagement of the blades with the bread is at only a portion of its length.

More specifically, it is an object of this invention to provide cutting units including blade supporting members so arranged that the blades of one unit are interposed between those of the other and the cutting edges of all of the blades collectively lie substantially in two annularly disposed planes so that the cutting edges of the outermost blades are in advance of the cutting edges of the medial blades.

In this connection, another very important object of this invention is to arrange the blades in successively receding steps, with two blades from each assembly, one at each side of its vertical center, lying in each step. This disposition of the blades insures the simultaneous engagement of adjacent blades, one from each assembly, with the loaf, so that the action of the blades of the two assemblies is at all times balanced.

Consequently, the effect of the blades on the loaf without the assistance of horizontal guards, holds the loaf against any tendency to shift vertically, notwithstanding the generally V-shaped arrangement of the blades.

Another object of this invention resides in the provision of improved means for reciprocating the cutting units and in a simplified means for readily detachably connecting the reciprocating means with the cutting units.

Still another object of this invention is to provide a simple drive mechanism for the entire machine with simple means for adjusting the speed of the conveyer which carries the loaves into the machine.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, I have illustrated several complete examples of the physical embodiment of my invention constructed according to the best modes I have so far devised for the practical application of the principles thereof, and in which.

Figure 1:
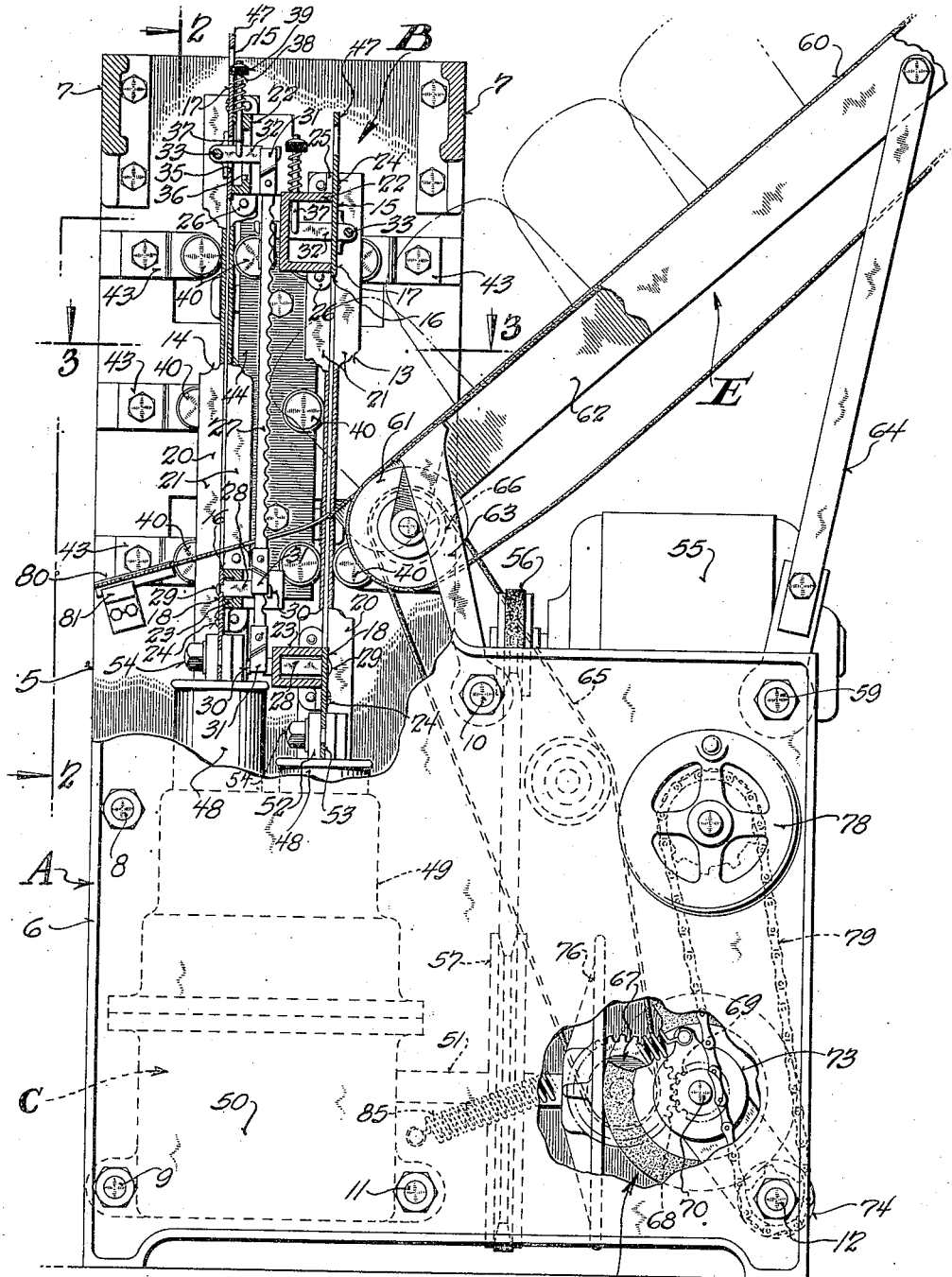
Figure 1 is a side elevation of a bread slicing machine embodying this invention with parts broken away and in section to illustrate structural details.
Figure 2:
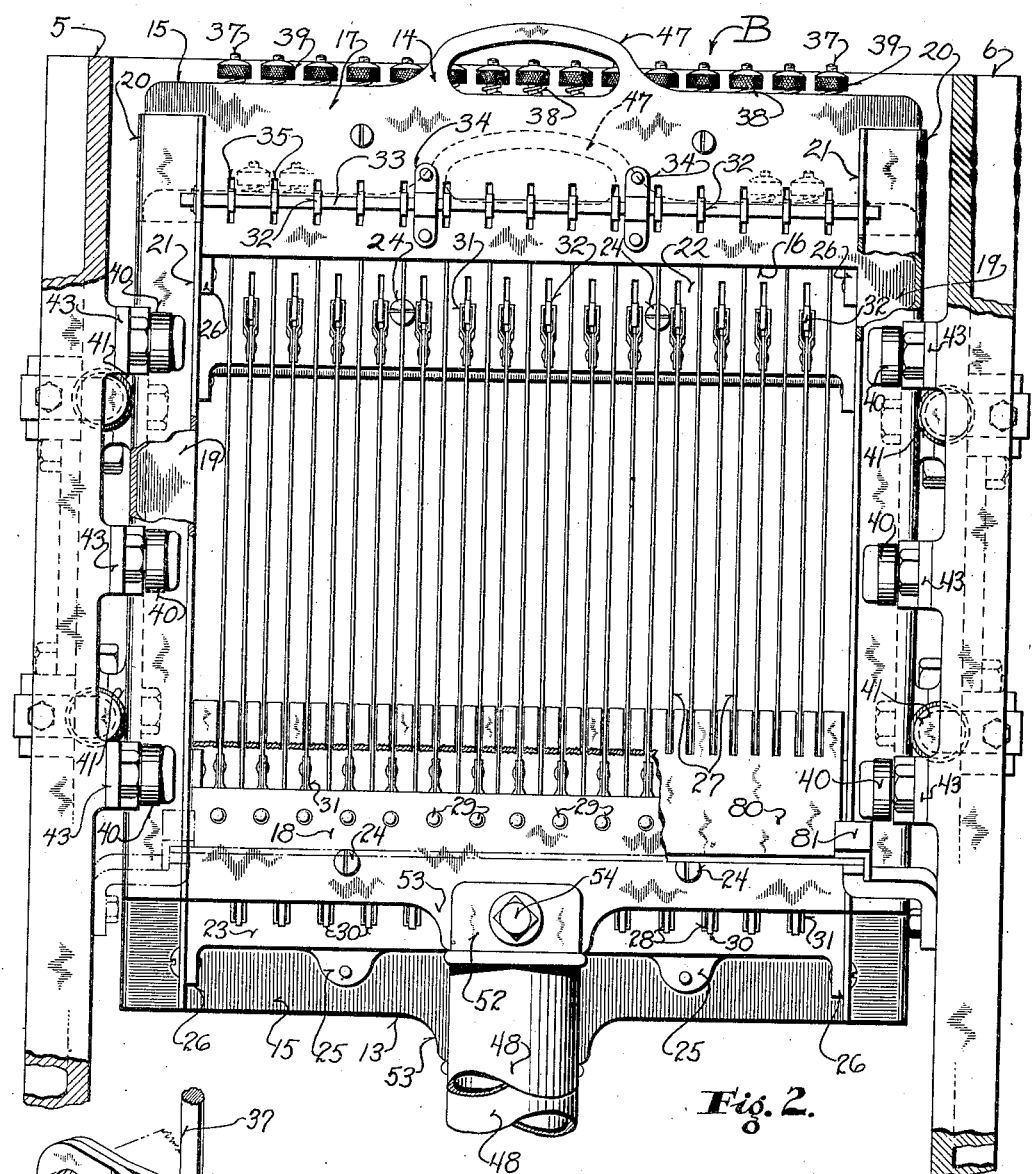
Figure 2 is a front view of the upper portion of the machine taken on the plane of the line 2—2 of Figure 1, and illustrating the cutting units in elevation.

The machine, as illustrated in the accompanying drawings in which like numerals indicate like parts throughout the several views, comprises a main frame A, a slicing head B, reciprocating means C for the slicing head, a power transmission D, and a conveyer E for conducting the loaves of bread to the slicing head.

The main general frame consists of two spaced side walls 5 and 6 rigidly connected by two cross beams 7 and a plurality of tie rods 8, 9, 10, 11 and 12.

The slicing head B is mounted between the upper portions of the side walls 5 and 6 and comprises two reciprocable cutting units 13 and 14 mounted for simultaneous and opposite vertical reciprocation. The two cutting units 13 and 14 are identical, except for the specific arrangement of the blade supports thereon, which, as will be hereinafter more fully described, are arranged so that the barrier presented by the cutting edges of the blades is non-planar, preferably V shaped or curved.

Each cutting unit comprises a flat substantially rectangular sheet metal plate 15, having a rectangular opening 16 in its medial portion to divide the plate into spaced upper and lower cross bars 17 and 18, respectively, integrally connected by side rails 19. Fixed to the side rails 19 are reinforcing or stiffening members 20 folded on their longitudinal axes to provide two integrally connected flanges spaced apart sufficiently to receive therebetween the side rails, and again folded outwardly to form flanges 21.

The stiffening members 20 are thus in the form of two opposed angle members joined at the adjacent edges of their parallel flanges. The rounded edge formed by the juncture of said parallel flanges together with their outer faces provide guide rails or tracks engageable with guide means to mount the units for vertical reciprocation as will be hereinafter more fully described.

Extending across the upper and lower cross bars 17 and 18 are hollow reinforcing members 22 and 23 respectively. These reinforcing members, which in the present instance are shown as castings, although it is understood that they may be stamped of sheet metal, are fixed to the upper and lower cross bars by means of screws 24 passed through the cross bars and threaded into ears or lugs 25 formed on the reinforcing members. The stiffening members 20 at the sides of the plate are also rigidly fixed to the reinforcing members by screws passed through the outwardly extending flanges of the stiffening members and threaded in lugs 26 formed on the ends of the reinforcing members.

Each plate is thus reinforced to carry the stress imposed thereon by the tension of the cutting blades 27 which are mounted from the upper and lower cross bars, as now about to be described.

The reinforcing members, both upper and lower, of the two reciprocable units 13 and 14, are identical except that the outer faces of the reinforcing members carried by the unit 13 are convex, whereas the adjacent outer faces of the reinforcing members carried by the unit 14 are concave. In the present instance, these outer edges of the reinforcing members are V shaped beads, but if desired, a curved shape may be employed.

Projecting from the angularly disposed facing sides of the lower reinforcing members of both units are blade supports 28. These supports 28, as best shown in Figure 1, are flat members having their inner ends riveted as at 29 to the lower cross bars of the plates and project outwardly through slots in the lower reinforcing members to terminate in hooks 30 with which loops 31 on the ends of the cutting blades are readily detachably engaged. The slots in the faces of the reinforcing members through which the blade supports 28 project, fit the supports snugly so that stress imparted thereto by the tension of the blades is transmitted directly to the reinforcing members and to the stiffening members at the sides of the unit.

The upper ends of the cutting blades also have loops 31 which are readily detachably engaged with hooks or blade supports 32. These supports, however, are not fixed, but are movable and normally yieldably urged upwardly to place the blades in tension.

As best shown in Figure 1, these hooks are pivotally mounted on a rod 33, which extends across the width of the cutting unit, being anchored at its ends in holes formed in the outward flanges of the stiffening members and further supported by bearings 34 fixed to the upper cross bar at intermediate points.

The free ends of the hooks 32 extend through elongated vertical slots 35 and 36 in the upper cross bar and the outer wall of the reinforcing member respectively so that the outer end of each hook is freely vertically movable. Connected with each hook is a tension stud 37 which projects upwardly through a suitable opening in the upper wall of the reinforcing member to mount a compression spring 38. The spring 38 is confined between the outer face of the upper wall of the reinforcing member and an adjustable nut 39 threaded on the tension stud, to draw its hook upwardly placing the cutting blade connected therewith in tension. Removal of any single blade is readily accomplished merely by depressing the tension stud of its upper hook sufficiently to permit disengagement of the blade.

In view of the angular disposition of the facing walls of the reinforcing members, it is evident that the blade supporting hooks must be of different lengths with the longer hooks of the unit 14 located at the outer extremities, and those of the unit 13 located at the center.

It is also observed that the blade supporting hooks and consequently the blades carried thereby, of one unit are interposed between those of the other unit, the distance between the adjacent blades determining the slice thicknesses. For different slice thicknesses, different units are provided with the blades positioned closer together or farther apart.

The non-planar or V shape of the barrier formed by the cutting edges of the blades which face towards the back of the machine and the conveyer E, causes the outer blades to contact the loaf before the center blades, and inasmuch as one unit with all its blades is moving down while the other unit with its blades is moving up, it is evident that the blades must be so positioned that two blades, one from each unit are always contacting the loaf simultaneously. Consequently, the length of the blade supporting hooks is such that the outer two blades, one from each unit, on each side of the barrier, lie in the same plane, the next two on each side lie in a plane stepped back therefrom, and so on until all of the blades are accounted for.

The cutting edges are thus not in two exact, angularly disposed planes, but are positioned in a series of planes each stepped back a little further. This non-planar disposition of the blades materially minimizes the load on the drive mechanism as upon initial engagement of the loaf with the blades, the cutting action is begun at only part of the length of the loaf.

As hereinbefore stated, the blades are placed in tension. Obviously, this imposes a stress on the cutting units, but in view of the novel construction, any tendency imparted by the tension of the blades to bow the plates is offset by the reinforcing and stiffening members so that the stress created by the tension of the blades is all retained within the cutting units and is not transmitted to any other part of the machine and particularly not to the means for guiding the units for vertical reciprocation.

The guide means to mount the units for reciprocation consists of a plurality of rollers 40 mounted from the side walls of the main frame A, to engage the parallel flanges of the stiffening members 20, and other rollers 41 also mounted from the side walls but arranged to contact the rounded outer edges of the stiffening members.

The rollers 40 are arranged in sets with three at the front side of each unit and two at the rear, the rollers at the front side receiving the stress during the cutting operation as the loaves are fed from the back of the machine and pass outwardly to the front.

Figure 5:
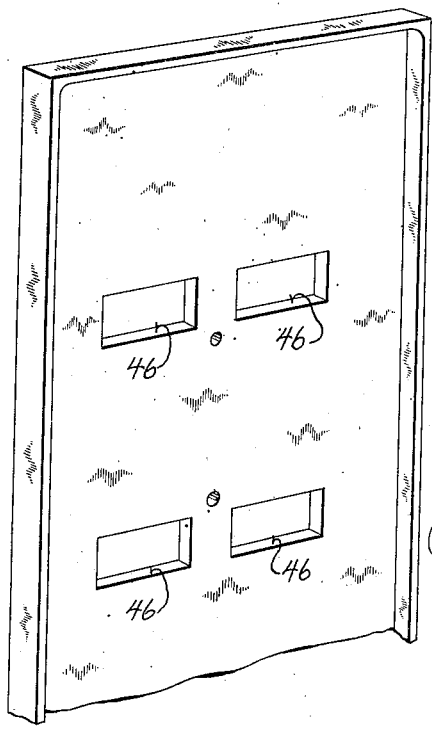
Figure 5 is a detail perspective view showing a portion of one side frame and part of the antifriction guideway for the cutting units.
Figure 5:
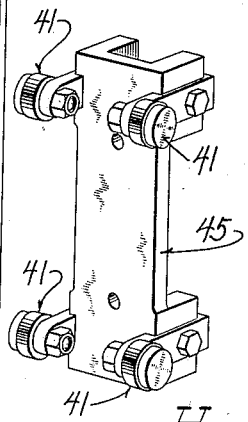
Figure 4:
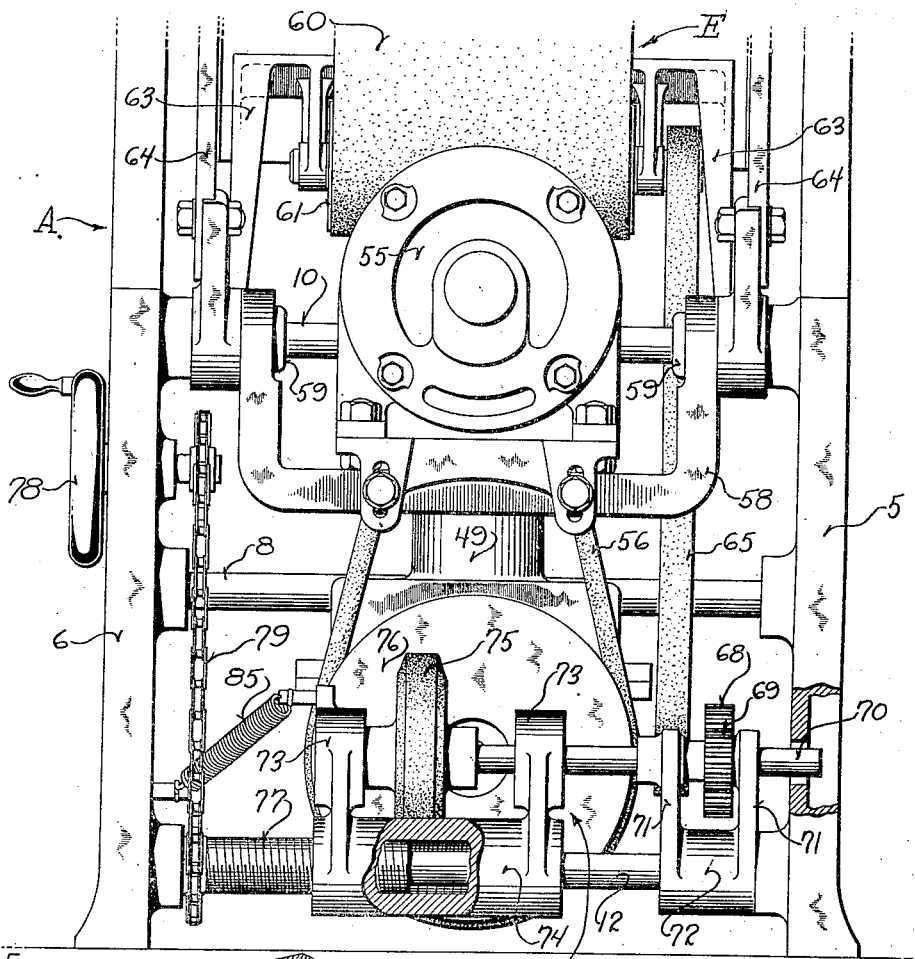
Figure 4 is a back view of the lower portion of the machine.

The sets of three rollers 40 for the unit 13 and the sets of two rollers 40 for the unit 14 are carried by individual brackets 43 fixed to the inner faces of the side walls 5 and 6. The other rollers 40, that is, the sets of two for the unit 14 and the sets of three for the unit 13 are carried by common plate members 44 which are bolted to the inner face of the side walls 5 and 6, between the two units. The same bolts which secure the plate members 44 to the side walls also pass through plates 45 which carry the edge rollers 41 for both units, the rollers 41 projecting through openings 46 in the side walls (see Fig. 5).

Both units with their blades all assembled thereon are readily removable from the machine to permit the substitution of other units, merely by withdrawing the same upwardly after they have been disconnected from the reciprocating means C. To facilitate such upward withdrawal of the units, their cross bars 17 are provided with handles 47.

The reciprocating mechanism C comprises two pistons 48 slidably mounted in a cylinder block 49 which forms a cover for a crank housing 50. The inner ends of the pistons 48 are connected with cranks (not shown) carried by a shaft 51 which enters the housing through its rear wall.

The upper ends of the pistons 48 are each provided with spaced lugs 52 between which an extension 53 projecting from the lower cross bar is received. Studs 54 threaded in the lugs 52 and passing through apertures in the extensions 53 of the plates serve to readily detachably connect the plates with the pistons.

The crank housing 50, and in fact, the entire reciprocating unit C is conveniently supported from the tie rods 9 and 11, as clearly shown.

The shaft 51 is driven directly from a motor 55 through a belt 56 which drivingly connects the pinion of the motor with a large pulley 57 fixed on the shaft 51. The motor 55 is mounted on a cradle 58 supported from studs 59 carried by the side walls 5 and 6, and the tie rod 10.

The conveyer E which carries the loaves of bread into the machine may be of any suitable construction and in the present instance, is shown as an endless belt 60 trained about a drive pulley 61 and an idler pulley (not shown), both of which are carried by a frame 62. The frame 62 is supported by upright arms 63 and 64 extending upwardly from the tie rod 10 and the studs 59 respectively, to position the frame at an incline as shown.

The drive pulley 61 is driven by a belt 65 trained about a pulley 66 fast on the shaft of the drive pulley and over a driving pulley 67 located adjacent the shaft 50 beneath the motor 55. This driving pulley 67 is mounted on a shaft supported in any suitable manner from the side wall 5. A gear 68 is also mounted on said shaft to mesh with a pinion 69 slidably splined on a shaft 70.

The shaft 70 is journalled in bearings 71 formed at the outer ends of a yoke 72 mounted on the tie rod 12. This yoke holds the pinion 69 against axial movement, but permits the sliding of the shaft 70 through its bearings 71. The inner end of the shaft 70 is journalled in bearings 73 formed in the outer ends of two arms projecting from a sleeve 74. Between the bearings 73 is a friction wheel 75 fast to the shaft 70 and bearing against a driving disc 76 secured to the outer end of the shaft 51 so as to be driven at a constant speed from the motor 55. A tension spring 85 holds the friction wheel in engagement with the driving disc.

The sleeve 74 is threaded on an externally threaded bushing 77 freely rotatable on the tie rod 12 and adapted to be turned upon actuation of a handle wheel 78 through a chain and sprocket connection 79.

Upon rotation of the bushing 77, the sleeve 74 and consequently the friction wheel 75 is shifted one way or the other toward or away from the axis of the driving disc 76. Obviously, the greater the distance between the point of engagement of the friction wheel 75 and the driving disc to the axis of the disc the faster will be the speed of the conveyer, and vice versa.

As the loaves of bread are fed down into the slicing head by the conveyer, they are supported on a table 80 removably mounted between the side walls of the machine. This table has its inner portion slotted to form substantially a comb with its fingers projecting through the spaces between the blades and terminating adjacent the lower end of the conveyer. As it is necessary to remove the table 80 to permit withdrawal of the cutting units, its side edges are slidably mounted as at 81.

The usual adjustable side guides along the conveyer and above the table 80 to hold the loaves against endwise shifting are provided, but as these guides form no part of the present invention, they have not been shown.

Figure 6:
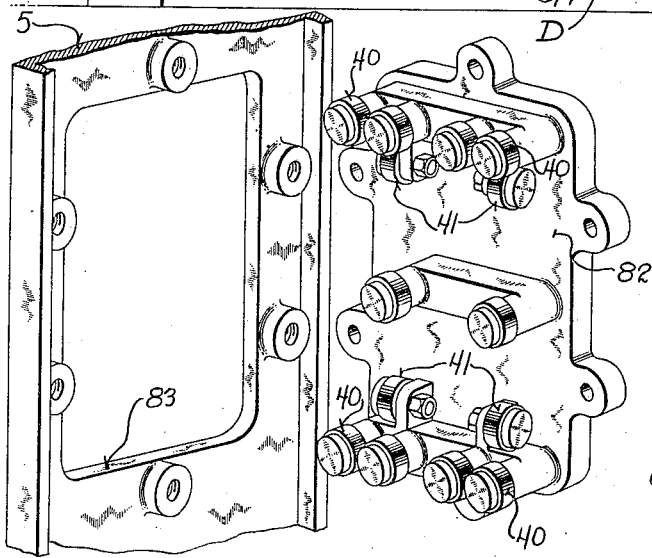
Figure 6 is a view similar to Figure 5 showing a slightly modified construction of the guideway.

In the construction described, the various rollers which together form the guideways for the reciprocable units, are individually and sectionally mounted from the side frames of the machine. If desired, all of these rollers may be mounted on a single plate 82 as shown in Figure 6. If this construction is employed, the side walls are cut away as at 83, also shown in Figure 6, and the plates 82 are held assembled with the side walls of the machine by cap screws.

Figure 7:
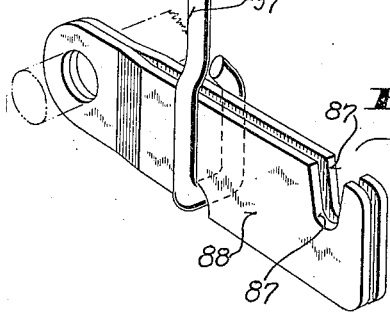
Figure 7 is a detail perspective view showing one end portion of a cutting blade of modified construction and a modified attaching hook therefor.
Figure 8:
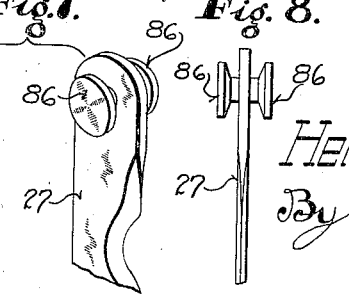
Figure 8 is a detail edge view of the cutting blade shown in Figure 7.
Figure 3:
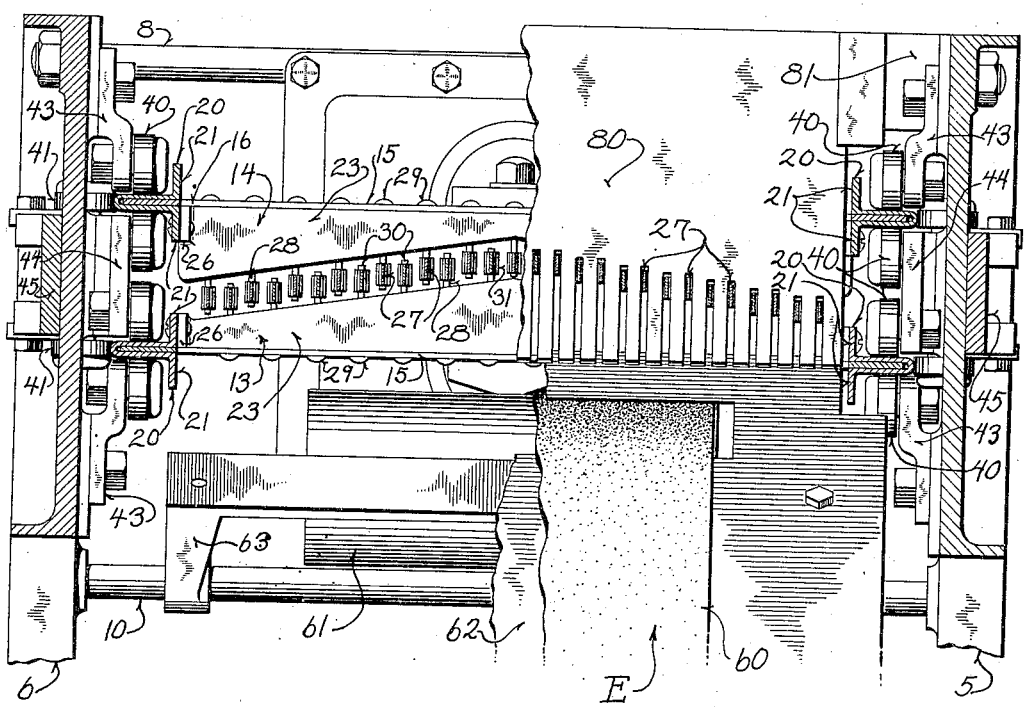
Figure 3 is a cross section view taken through Figure 1 on the plane of the line 3—3.

A modified construction of the blade supporting hooks and the manner of attaching the blades thereto is shown in Figures 7 and 8. As shown therein, the blade instead of being provided with the conventional loops, has two buttons or headed studs 86 fastened to its opposite ends which are engageable in notches 87 formed in spaced fingers 88, which together form the supporting hook. The inner ends of the fingers 88 are rigidly connected and are apertured for engagement with the supporting rod 33 as hereinbefore described. The tension stud 37 is also provided to draw the hook upwardly and place the blade in tension.

What I claim as my invention is:

1. In a slicing machine having means to feed loaves of bread and the like along a definite path, two sets of cutting blades forming a barrier across said path, means to simultaneously reciprocate said sets of cutting blades in opposite directions, and means to mount the individual blades of said sets so that the blades of one set are interposed between those of the other, and the cutting edges of all of the blades are arranged in steps one behind the other with respect to said path and with the cutting edges of at least one blade from each set in each step.

2. In a bread slicing machine having means to feed loaves of bread and the like along a definite path, a pair of reciprocable cutting units forming a barrier across said path, means to simultaneously and oppositely reciprocate said units, each unit comprising a plurality of parallel cutting blades, spaced cross pieces, blade supporting members on the facing sides of said cross pieces, and blade engaging means on said supporting members, the blade engaging means of the two units being interposed one between the other and being arranged in pairs with each pair composed of blade engaging means from both units so located with respect to each other as to position the cutting edges of the blades carried thereby in a common plane parallel to the barrier formed by the cutting units, and said pairs of blade engaging means extending different distances from the supporting members so as to arrange the pairs of blades in steps to successively engage the loaves as they are fed along said path.

3. In a bread slicing machine, a frame having spaced sides, means to feed loaves of bread along a definite path between said spaced sides, a plurality of spaced cutting units mounted for reciprocation between said sides, means to simultaneously and oppositely reciprocate said units, a set of cutting blades for each of said units, means to mount the blades on said units with the blades of one set interposed between those of the other set and with the cutting edges of all of the blades facing one way, said units being so located that the cutting blades form a barrier across said path along which the loaves are fed, said blade mounting means being of different lengths with the length of each two adjacent mounting means complementary so that the blades held thereby are in positions at which their cutting edges lie in stepped planes with respect to said path so that the barrier formed by the cutting blades is of stepped non-planar formation to preclude simultaneous contact of all of the blades with a loaf, and said reciprocating units being readily removable from the machine with their blades in position.

4. A cutting unit for bread slicing machines comprising a flat metal plate having its medial portion cut away to form spaced upper and lower cross bars connected by side rails, a plurality of parallel cutting blades extending across the space between the upper and lower cross bars, means on said upper and lower cross bars to engage the ends of the blades and mount the same, tensioning means associated with the blade mounting means whereby the blades are placed in tension which results in the application of a stress on the plate tending to bow the same, and means fixed to the plate to offset the tendency toward bowing including angle members fixed to opposite sides of the side rails with the edges of their adjacent flanges projecting beyond the plate to form a track slidable in guideways to mount the unit for reciprocation.

5. A cutting unit for bread slicing machines comprising a flat metal plate having its medial portion cut away to form spaced upper and lower cross bars connected by side rails, a plurality of parallel cutting blades extending across the space between the upper and lower cross bars, means on said upper and lower cross bars to engage the ends of the blades and mount the same, tensioning means associated with the blade mounting means whereby the blades are placed in tension which results in the application of a stress on the plate tending to bow the same, and means fixed to the plate to offset the tendency toward bowing including a stiffening member folded longitudinally to form two opposed angles with the adjacent flanges thereof parallel and spaced apart a distance to receive the side rails of the plate and with the folded edge and said flanges forming tracks slidable in guideways to mount the unit for reciprocation.

6. In a slicing machine of the character described having means to feed loaves of bread and the like along a definite path, a pair of oppositely reciprocable cutting units forming a barrier across said path, each cutting unit comprising a carrier and a plurality of cutting blades, and means to mount the blades on the carriers with the blades of one unit interposed between those of the other unit and with the cutting edges of the blades of both units arranged in steps along said path with the cutting edges of at least one blade from each unit in each step.

7. In a slicing machine of the character described having means to feed loaves of bread and the like along a definite path, a pair of oppositely reciprocable cutting units forming a barrier across said path, each cutting unit comprising a reciprocable carrier and a plurality of cutting blades, and means to mount the blades on the carriers with the cutting edges thereof arranged in successively receding steps along said path with the cutting edge of at least one blade from each unit in each step.

8. In a slicing machine of the character described, a pair of oppositely reciprocable cutting units, each comprising a blade carrier and a plurality of spaced blades parallel to the direction of reciprocation, and means to mount the blades on the carriers with the blades of one unit interposed between those of the other and the cutting edges of all of the blades collectively forming a non-planar barrier symmetrically arranged on opposite sides of the longitudinal centers of said units and with the cutting edges disposed in successively receding steps and the cutting edges of two blades of each unit in each step.

9. In a slicing machine, a pair of cooperating oppositely reciprocable cutting units, each comprising a reciprocable blade carrier and a plurality of spaced blades parallel to the direction of reciprocation, means to mount the blades on the carriers comprising supports of different lengths to which the ends of the blades are attached, the supports of one unit being arranged alternately between the supports of the other unit so that the blades of one unit are interposed between the blades of the other unit and adjacent supports of the two units being of corresponding lengths so that the cutting edges of the blades carried thereby are in line and the cutting edges of all of the blades collectively form a barrier composed of successively receding steps, whereby the cutting edges of the blades forming the barrier successively engage a loaf fed therethrough and whereby two blades, one from each unit, simultaneously engage the loaf, and means to feed a loaf through said slicing barrier.

HENRY FRITZ, Sr.